United States Patent
Bonilla

[11] Patent Number: 5,845,984
[45] Date of Patent: Dec. 8, 1998

[54] FELINE REPELLANT DEVICE

[76] Inventor: Lawrence Bonilla, 100 E. Third St., National City, Calif. 91950

[21] Appl. No.: 692,701

[22] Filed: Aug. 6, 1996

[51] Int. Cl.[6] .................................................. F21V 33/00
[52] U.S. Cl. ........................ 362/101; 362/253; 362/311; 362/318; 362/382; 119/905
[58] Field of Search ............................. 362/31, 32, 101, 362/102, 153, 153.1, 154, 253, 331, 332, 363, 382, 318, 311; 340/573; 220/602, 605, 606, 628, 662; 119/650, 718–721, 905

[56] References Cited

U.S. PATENT DOCUMENTS

| | | | |
|---|---|---|---|
| 1,843,781 | 2/1932 | Pearson | 362/31 |
| 2,549,627 | 4/1951 | Musch et al. | 362/102 |
| 3,780,260 | 12/1973 | Elsner | 362/101 |
| 4,223,374 | 9/1980 | Kimmel | 362/31 |
| 4,647,433 | 3/1987 | Spector | 362/101 |
| 4,858,083 | 8/1989 | Wakimoto | 362/101 |
| 5,458,093 | 10/1995 | MacMillan | 119/720 |
| 5,547,371 | 8/1996 | Rose | 362/161 |

*Primary Examiner*—Alan Cariaso
*Attorney, Agent, or Firm*—Donn K. Harms

[57] ABSTRACT

A device for repelling cats from areas where their presence is unwanted comprised a tranparent clylindrical shaped canister capable of light transmission therethrough which can optionally be mounted upon a center support having various attachments thereto for placement of the device in indoor or out door areas. An optional communication light source causes the canister to glow and transmit light when in a darkened area.

18 Claims, 2 Drawing Sheets

FELINE REPELLANT DEVICE

BACKGROUND OF THE INVENTION

1. Field of the Invention

This invention relates to a device for repelling cats and other feline type animals from areas which there presence is not desired. More particularly it allows for a non chemical manner in which to repel cats from areas where they are not wanted and to keep such animals from defecating in these areas and or depositing parasites in these areas that can be harmful to humans.

2. Prior Art

Throughout the United States and the around the globe domesticated pet cats and feral cats inevitably have to relieve themselves of fecal matter and urine. Male cats are also known to urinate to mark territory they consider their own.

Unfortunately, the smell created from this normal act of these creatures is a nuisance. Further, the germs generated from the fecal matter and urine can cause illness, especially in children. Many a playground sandbox during the day, becomes a cat box of dreams at night. The result being fecal matter, urine, and the germs generated by them being occupying the sandbox used by children during daylight.

Cats also are known to carry parasites and diseases that are harmful to humans. According to Compton's Encyclopedia among the diseases and cats are known to carry lice, fleas, worms, and a fungous skin disease known as ringworm. The worms can cause intestinal illness. Fleas of course are commonly known to cause bites and itching. Lice can infect humans especially children who play in areas frequented by cats. Finally, ring worm is a fungous skin disease carried by infected cats that can easily infect humans causing a painful skin rash all over the body.

Cats are also known to cause an allergic reaction in some humans from their fur. For persons allergic to cat hair the contact with hair shed by cats can cause symptoms similar to hay fever as well as skin rashes.

In addition to the medical reasons for keeping cats from given areas, cats also can cause physical damage to gardens and other yard areas from digging and to indoor areas and furniture from clawing. Couches and curtains are known to be a favorite clawing spot for indoor cats.

Currently, there exist some in chemical and electronic form of cat repellents on the market. The chemical known by the trade name Limoene, produced in a granular form is used to repel cats from unwanted areas. However the effect is short lived and possibly toxic to the environment and to children or adults frequenting the chemically sprayed areas. Further, Limoene treated sand or other granular substances cause another problem to the person using them to repel cats. The odor is extremely strong from the Limoene and instead of cats to put up with the user must put up with a constant odor.

The electronic form of repellent advertised in magazines and newspapers consists of a sound generating device and requires a power source and speaker. They purport to produce ultrasonic sound that is annoying to cats and thus keep the errant felines away. However, this means of cat repellent may also be annoying to other animals capable of hearing high frequency sound and also requires batteries and speakers to be maintained.

As such, there currently exists a need for a non chemical, non toxic, passive cat repellent device to keep unwanted cats away from children's play areas as well as from property where they are not wanted or could cause allergy or disease. The odd light refractive nature of the transparent cylinder portion of the invention scares the animal away from it. Cats upon seeing the invention shy away from it and the are in which it is located.

SUMMARY OF THE INVENTION

Applicant's device, a transparent cylindrical lens made of a solid or liquid filled cylinder or canister, produces a visual image refraction and distortion and a chromatic aberration effect that is a repellent upon cats approaching the area directly proximate to the invention. While any size or diameter cylinder scares the animal away, the larger the cylinder the farther the animal keeps its distance. It uses no chemicals which can leave harmful residue for children or other animals who come into contact with it. It also has no ill odor as has been a problem with the aforementioned Limoene or harmful effects upon the environment.

Another advantage of applicant's device over prior art is that to function fully, it does not require a power source nor a speaker and as such needs no real maintenance. Once placed in the area where cats are to be repelled, it works indefinitely.

In summary, the present invention is an improvement over cat repellents now in use and known in prior art. The device is comprised of one or a plurality of transparent cylinders or other shaped canisters. The cylinders are comprised of a solid transparent material throughout, or made of a thin wall clear plastic which is filled with a clear liquid. The canister can be attached to a mounting bracket which at the option of the user, can be attached to a number of different mounting attachment devices such as a ground spike, a hook or eye, a cork screw type ground spike, corner bracket, or in areas where a ground spike cannot be used such as on cement or indoors, the mounting bracket can be attached to a base plate which sits upon the hard surface to hold the invention erect for optimum function.

In the event the invention is to be placed in a sandbox, a point, spike, or cork screw style mounting devices may be attached to one side of the mounting bracket which is attached at one end or side of the cylinder portion of the invention. Should the user desire to place the device indoors next to a couch or furniture used by the cat as a scratching post to deter such actions, a flat base may be attached to a center support or directly to the mounting bracket or to the canister portion itself may be used for placement on the floor in the area where the cat is to be repelled. This embodiment would also work in areas of concrete, cement, or hard soil where the ground attaching devices are not practical.

A preferred material for the manufacture of the transparent liquid container embodiment of this invention is a clear or transparent plastic or other synthetic material or glass that is resistant to sunlight such as acrylic plastic or vinyl chloride, polyethylene, polypropylene, or any plastic having an ultra violet light inhibitor mixed with the plastic. However any plastic exhibiting sufficient resistance to sunlight and elements would suffice. Solid plastic cylinders or spheres used for the lens or canister portion of the invention can also be made from any plastic or synthetic material which will hold up to the elements such as the aforementioned.

The canister portion of the invention can vary in shape in that it can be cylindrical, rectangular, or other geometric shapes, however cylindrical appears to produce the best results in the repellent of cats due to the refraction characteristics of the curve of the outside of the cylindrical shape and the aforementioned visual distortion produced. Solid cylinders, or hollow, liquid fillable cylinders formed of Polystyrene, polypropylene, polyethylene, and other plastics can be uses so long as they have the necessary ultra violet light inhabitance to remain relatively transparent after prolonged exposure to sunlight. Clear or transparent glass could be used for the container however in areas where breakage of the glass could cause injury, the plastic material would be superior due to its stability.

The plastic or glass used in the canister, while being transparent, or see through, can be tinted to achieve color if desired by the user. While green, blue, or brown, might be colors that would be eye pleasing in various areas, any color could be used.

Manufacturing the canister portion of the invention could be accomplished by molds filled with appropriate material, injection molding, glass blowing, or other conventional industrial manner of manufacturing transparent blocks, cylinders, and liquid containers.

The mounting bracket and ground mounting attachments could be manufactured of the same material as the canister and could also be made part of the canister portion of the invention forming a unitary structure if desired by injection molding or other manufacturing process yielding a one piece product with all of the mounting hardware attached to the canister.

Modular construction using a mounting brackets with detachable components including one or more of a ground attachment or structure attachment means, such as, a member, an eye or hook, a base plate, a spike, a cork screw, a corner bracket, a suction cup, or other conventional attachments providing versatility of use can be accomplished by making such parts in a manner which allows for the easy attachment and detachment of the various components from each other and the transparent liquid container. This could be accomplished by threading the ends of the various parts to accept each other, or by providing a collar corresponding accepting part on the various parts so that they could be put together much like plastic pipe and sleeve fittings.

However, if a more sturdy or heaver mounting bracket is desired, it could be made of metal such as aluminum, or steel, or of hard plastic material different from the material used for the clear canister. The mounting bracket and ground attachment portions of the invention can be machined, die cast, or injection molded depending upon the material used to manufacture those individual parts.

It should be noted however, in some areas, no mounting bracket or ground attachment device need be used if the clear canister can be placed and left in that area in a manner where it will sufficiently remain in place. Such an area might be indoors on a flat surface or outdoors on a flat surface where the canister itself can sit.

The invention can also be provided with a light source such a as a conventional light bulb or light emitting diode, or combination of a conventionally used light source and fiber optic transmission of that light to the canister element. This enhances the repellent effect of the visual aberration and distortion deterring the animal as well as providing yard lighting. The light source can be powered in a conventional manner such as a transformer.

It is an object of this invention to provide a cat repellent device which will keep cats away from areas where they are not wanted or their presence might cause disease or sickness to humans who follow.

It is a further object of this invention to provide a passive cat repellent device which is non toxic and free of chemicals which may be harmful to humans and the environment.

It is a further object of this invention to provide a passive cat repellent device which needs little maintenance.

An object of this invention is provide a cat repellent device with an anchoring system using a variety of configurations using various mounting brackets and ground mounting attachments, which allow for the invention to be used outside and mounted in soil or inside and seated upon the floor surface.

Another object of this invention is to provide a combined repellent and yard or walkway light in one component.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENT OF THE INVENTION

Figure 1:
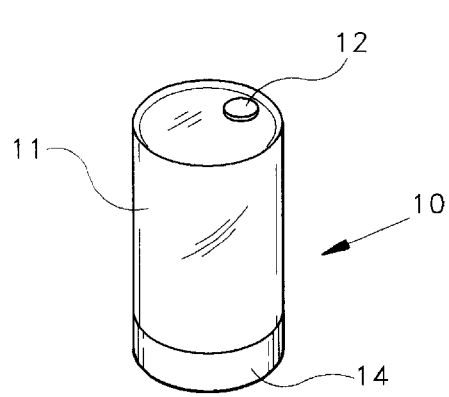
FIG. 1 is a perspective view of the invention showing the transparent liquid filled container embodiment of the invention.

FIG. 1 shows the cat repellent invention 10 in its simplest form with the transparent canister portion 11 in an upright position. The canister 11 could be constructed of solid clear plastic or as here depicted in having a hollow cavity within and having a selectively openable and closeable liquid filling orifice 12 located upon one end of the transparent canister 11.

The orifice 12 could be placed wherever practicable and could be closed after filling the canister 11 by the attachment of a removable mounting bracket 14 to the orifice using threads or other conventional attachment. If one end of a hollow type canister was the filling orifice 12, the mounting bracket 14 could serve as both a cap for closure of the orifice as well as a base for the canister 11. This arrangement would also work if the canister 11 were solid plastic instead of hollow however no liquid fill would be required.

Figure 2:
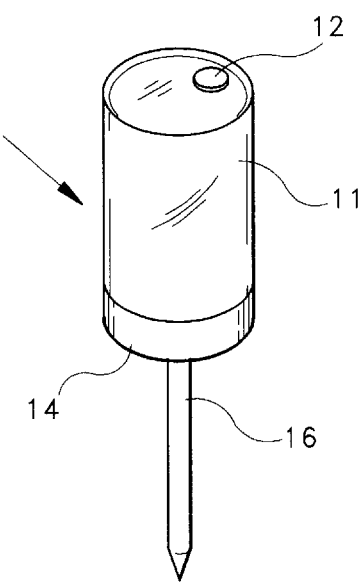
FIG. 2 is a side view of another embodiment of the invention showing the transparent canister mounted upon a center support post.

FIG. 2 depicts the cat repellent invention 10 with a mounting bracket 14 attached to a ground attachment spike 16 and having a filling orifice 12 at the opposite end to the spike 16. The filling orifice 12 is located at the top of the canister 11 for illustration purposes only as the orifice 12 could be anywhere upon the canister 11 that is suitable for the environment or location in which the invention 10 is to be placed or is commercially practicable or desirable. If a solid plastic canister 11 were used, then nor orifice 12 would be needed.

This embodiment, as well as the other embodiments illustrated, could be injection molded into a unitary structure with the ground attachment means 16 being one of a spike 16, a hook 18, an eye 22, a corner bracket 17, or a member 18 and base plate 20. However, as with all of the embodiments shown in the drawings, the embodiment in FIG. 2 could also be manufactured in a modular form with a detachable mounting bracket 14 from the container 11 with a detachable ground spike attachment device 16 of a type suitable for the environment in which the invention 10 would be placed. It is envisioned that all of the attachments could be made interchangeable with the canister 11 and each other for a modular system of attachment depending upon the desired placement of the invention.

Figure 3:
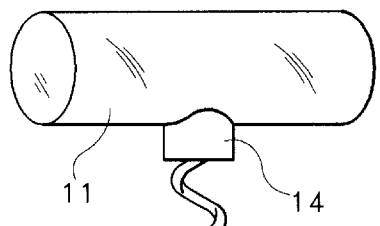
FIG. 3 is a side view of a third embodiment of the invention showing the canister mounted horizontally upon a center screw support which can be inserted into the ground.

FIG. 3 depicts a horizontally mounted canister 11 attached to the mounting bracket 14 which is attached to a cork screw style ground spike 28. This embodiment would work well in hard soil areas or sand. This embodiment as could easily be molded or cast as a unitary structure if modular parts and mounting were not a requirement. While depicting a solid transparent canister 11 a hollow version filled with clear liquid could also be used.

Figure 4:
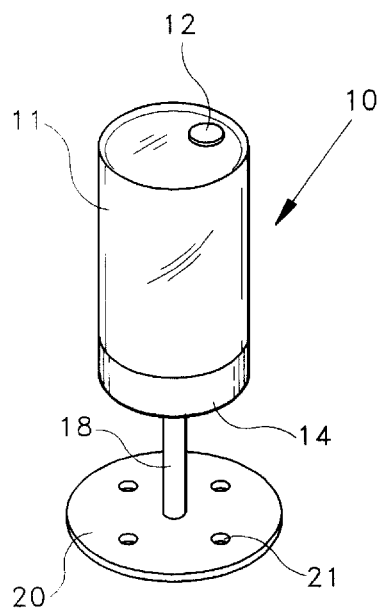
FIG. 4 is a side view of a third embodiment of the invention showing the clear canister attached to the center support to allow for the invention to be placed upon a surface either indoors or outdoors.

FIG. 4 depicts the transparent canister 11 with orifice 12 illustrated upon one end of the container 11 and the mounting bracket 14 located upon the bottom end of the canister 11. A member 18 is attached to the mounting bracket 14 and a base plate 20 is attached to the end of the member 18 opposite the mounting bracket 14. The base plate 20 could be weighted and while pictured in a circular design it could be of any shape suitable for the environment in which it is to be used. One or a plurality of apertures 21 can be located in the base plate 20 should the user desire to use a screw or other attaching device to mount the base plate 20 to the underlying surface. In cases where the solid plastic version of the canister are used, the base plate 14 may not be necessary as the canister 11 itself could be attached to the member 18.

Figure 5:
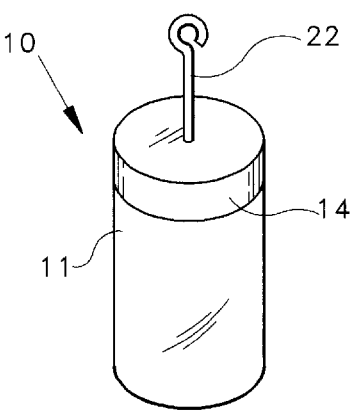
FIG. 5 shows a side view of the clear canister with an optional base attached to an eye hook fastener for hanging support.

FIG. 5 shows the invention 10 with the canister 11 having the mounting bracket 14 upon the upper portion of the canister 11. An eye 22 is depicted attached to the mounting bracket 14, however a hook, or other similar attaching device could be used. This embodiment works best when the invention 10 is to be attached to a string or rope and suspended above the surface of the ground. While this embodiment depicts a hollow canister 11 filled with clear liquid and the base 14 operating as the closure to an orifice on one end of the canister 11, in the alternative a solid canister 11 could be used and the base 14 modularly attached using threads or other conventional attachment, or the base 14 eliminated with a direct attachment to the eye 22 could also be used.

Figure 6:
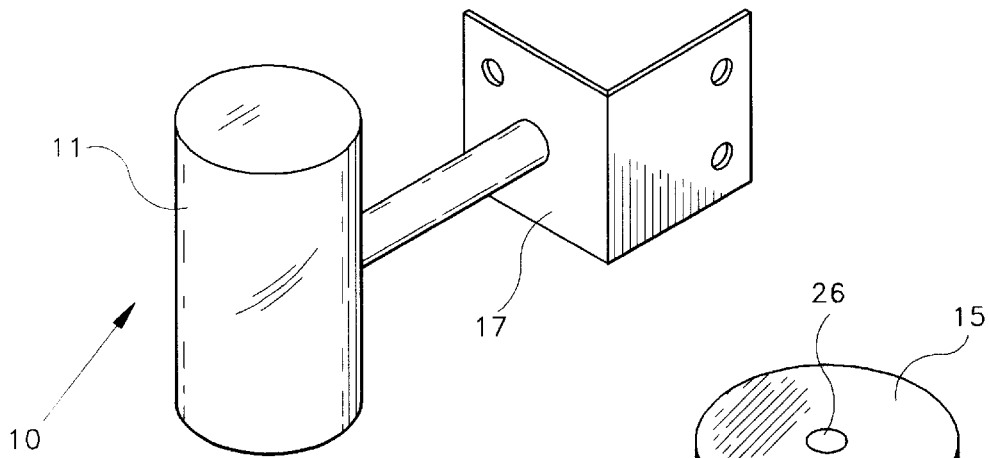
FIG. 6 is a perfective view of the clear canister attached via a support am to a corner bracket.

FIG. 6 illustrates the invention 10 with the canister 11 attached to a member 18 which attaches to a corner bracket 17. The corner bracket 17 has a plurality of apertures 21 located therein through which screws or nails or such can be inserted and mounted to the underlying mounting surface. This version of the invention would work best upon the corner of a building.

Figure 7:
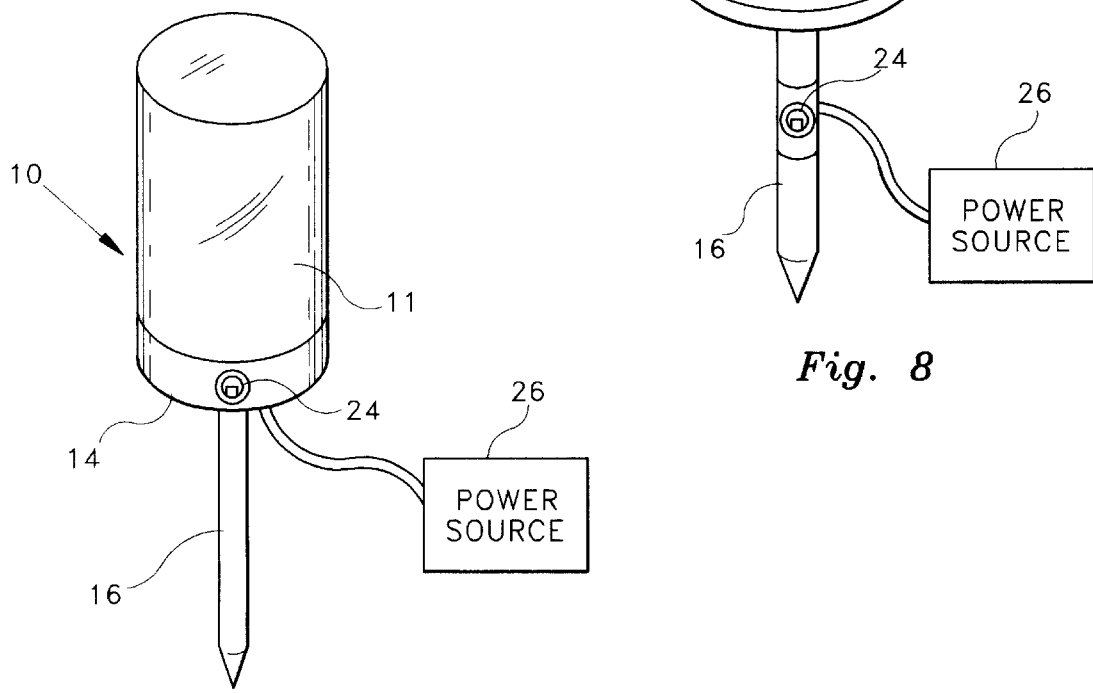
FIG. 7 is a side view of the invention depicting the clear canister mounted atop a base having a spike attachment and light source therein communicating light to the canister.

FIG. 7 illustrates the invention 10 depicting the transparent canister 11 mounted atop a base 14 having a spike attachment 16 and light source 24 therein communicating light to the canister 11. The communicating light source illuminates the canister 11 and increases the repellent effect at night as well as being visually distinctive. A power source such as a conventional low voltage transformer used in yard lighting supplies power to the light source 24. In this embodiment the invention 10 may also double as a decorative lighting fixture for lighting yards and walkways in this configuration and thus serve two purposes.

Figure 8:
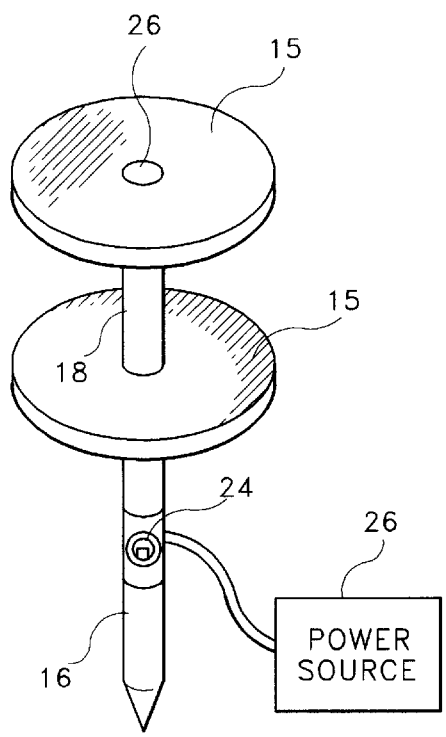
FIG. 8 depicts another embodiment of the invention which has a plurality of clear circular sheets of plastic attached to a center support which has a light source in communication with the plastic sheets.

FIG. 8 depicts another embodiment of the invention which can serve as a cat repellent device and double as yard or walkway lighting. This embodiment has a plurality of clear circular sheets of plastic 15 attached to a center support member 18 which has a light source 24 in communication with the plastic sheets 15. A cap 26 has a reflective surface on one side which reflects light from the light source 24 back into the member 18 for transmission to the flat sheets 15. A conventional power source 26 such as a transformer powers the light source 24. This flat plastic sheet embodiment of the invention because of the optical distortion characteristics of the sheets when viewed from the side works well in scaring and repelling cats from areas where they are not wanted.

While all of the fundamental characteristics and features of the cat repellent invention have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A cat repellent device comprising:
    cat repellent means comprising:
        at least one transparent canister capable of light transmission therethrough, having a first end, a second end, a means for causing visual aberration within said transparent canister; and
        a means for mounting said transparent canister in a desired location, whereby cats may be repelled from said desired location.

2. The invention as claimed in claim 1 wherein said transparent canister comprises:
    a transparent hollow cylindrical container having an interior cavity; and
    an orifice having a closed position, and having an open position communicating with said interior cavity, whereby said interior cavity may be filled with liquid capable of light transmission when said orifice is in said open position.

3. The invention as claimed in claim 1 wherein said transparent canister is a solid unitary cylindrical shaped structure composed of a light transmitting material.

4. The invention as claimed in claim 1 wherein said mounting
    means is the placement of said canister on one of either said first end or said second end in the desired location.

5. The invention as claimed in claim 2 wherein said mounting
    means is the placement of said canister on one of either said first end or said second end in the desired location.

6. The invention as claimed in claim 3 wherein said mounting
    means is the placement of said canister on one of either said first end or said second end in the desired location.

7. The invention as claimed in claim 1 wherein said mounting means is comprised of mounting bracket removably attached to said canister, said mounting bracket connected to one of a group consisting of a spike, a hook, an eye, a corner bracket, an elongated member, a base plate, a cork screw, and combinations thereof.

8. The invention as claimed in claim 2 wherein said mounting mounting means is comprised of mounting bracket removably attached to said canister, said mounting bracket connected to one of a group consisting of a spike, a hook, an eye, a corner bracket, an elongated member, a base plate, a cork screw, and combinations thereof.

9. The invention as claimed in claim 3 wherein said mounting mounting means is comprised of mounting bracket removably attached to said canister, said mounting bracket connected to one of a group consisting of a spike, a hook, an eye, a corner bracket, an elongated member, a base plate, a cork screw, and combinations thereof.

10. The invention as claimed in claim 7 additionally comprising a light source capable of connection to a power source communicating with said canister.

11. The invention as claimed in claim 8 additionally comprising a light source capable of connection to a power source communicating with said canister.

12. The invention as claimed in claim 9 additionally comprising a light source capable of connection to a power source communicating with said canister.

13. The invention in claim 7 wherein said canister is replaced by one or a plurality of flat sheets of solid transparent material.

14. The invention in claim 9 wherein said canister is replaced by one or a plurality of flat sheets of solid transparent material.

15. The invention claimed in claim 1 wherein said canister is a three dimensional shape other than cylindrical.

16. The invention claimed in claim 7 formed as a unitary structure.

17. The invention claimed in claim 8 formed as a unitary structure.

18. The invention claimed in claim 9 formed as a unitary structure.

* * * * *